United States Patent
Liu et al.

(10) Patent No.: US 12,024,798 B2
(45) Date of Patent: Jul. 2, 2024

(54) ANTI-COUNTERFEITING LYOCELL FIBER, PREPARATION METHOD THEREOF AND ANTI-COUNTERFEITING METHOD

(71) Applicant: SOOCHOW UNIVERSITY, Suzhou (CN)

(72) Inventors: Yuqing Liu, Suzhou (CN); Yu He, Suzhou (CN); Chengwei Wan, Suzhou (CN); Kaiyi Chen, Suzhou (CN); Zhong Wang, Suzhou (CN); Guohe Wang, Suzhou (CN); Zhijuan Pan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 442 days.

(21) Appl. No.: 17/615,447

(22) PCT Filed: May 20, 2021

(86) PCT No.: PCT/CN2021/094785
§ 371 (c)(1),
(2) Date: Nov. 30, 2021

(87) PCT Pub. No.: WO2022/100051
PCT Pub. Date: May 19, 2022

(65) Prior Publication Data
US 2022/0411967 A1 Dec. 29, 2022

(30) Foreign Application Priority Data
Nov. 11, 2020 (CN) .......................... 202011254961.7

(51) Int. Cl.
*D01F 2/10* (2006.01)
*C08K 5/17* (2006.01)
(Continued)

(52) U.S. Cl.
CPC ................ *D01F 2/10* (2013.01); *C08K 5/175* (2013.01); *C08L 1/02* (2013.01); *D01D 5/06* (2013.01);
(Continued)

(58) Field of Classification Search
CPC ..... D01F 2/10; D01F 1/10; D01F 2/08; C08K 5/175; C08K 5/0091; C08L 1/02;
(Continued)

(56) References Cited

U.S. PATENT DOCUMENTS

2012/0052036 A1\* 3/2012 Glenn, Jr. ............ C11D 17/041
510/276
2015/0377841 A1 12/2015 Gaynor et al.

FOREIGN PATENT DOCUMENTS

| CN | 1094408 A | 11/1994 |
| CN | 101307511 A | 11/2008 |

(Continued)

OTHER PUBLICATIONS

English translation of CN-110042490-A by EPO. (Year: 2019).\*

*Primary Examiner* — Timothy Kennedy
*Assistant Examiner* — Inja Song
(74) *Attorney, Agent, or Firm* — SZDC Law PC

(57) ABSTRACT

The present invention provides a preparation method of an anti-counterfeiting lyocell fiber, including the following steps: dissolving at least one amino acid metal chelate and a cellulose pulp in an aqueous solution of a cellosolve to obtain a spinning solution, and then performing wet spinning using the spinning solution to obtain an anti-counterfeiting lyocell fiber, wherein the amino acid metal chelate account for 0.2% to 0.6% of the total mass of the anti-counterfeiting lyocell fiber. The anti-counterfeiting lyocell fiber of the present invention uses an amino acid metal chelate for encryption, and the process is simple. The
(Continued)

prepared product can be provided with one or two passwords based on the ratio of metal ions and the amino acids, so that the product prepared from this fiber has the advantages of memory tracking properties, identification function and high anti-counterfeiting capability grade.

9 Claims, 1 Drawing Sheet

(51) Int. Cl.
*C08L 1/02* (2006.01)
*D01D 5/06* (2006.01)
*D01F 1/10* (2006.01)

(52) U.S. Cl.
CPC ............ *D01F 1/10* (2013.01); *C08L 2203/12* (2013.01); *C08L 2205/16* (2013.01); *D10B 2201/24* (2013.01); *D10B 2401/063* (2013.01); *D10B 2505/00* (2013.01)

(58) Field of Classification Search
CPC ............ C08L 2203/12; C08L 2205/16; D10B 2201/24; D10B 2401/063; D10B 2201/22; D01D 1/02; D01D 5/06; G07D 7/02; G07D 7/06

See application file for complete search history.

(56) References Cited

FOREIGN PATENT DOCUMENTS

| | | | |
|---|---|---|---|
| CN | 101942707 A | 1/2011 | |
| CN | 109070130 A | 12/2018 | |
| CN | 110042490 A | 7/2019 | |
| CN | 112501705 A | 3/2021 | |
| CN | 112501706 A | 3/2021 | |
| CN | 112538664 A | 3/2021 | |
| CN | 112609257 A | 4/2021 | |
| IN | 101349689 A | 1/2009 | |
| PH | 12012501957 B1 * | 4/2018 | ............ A61K 8/898 |

\* cited by examiner

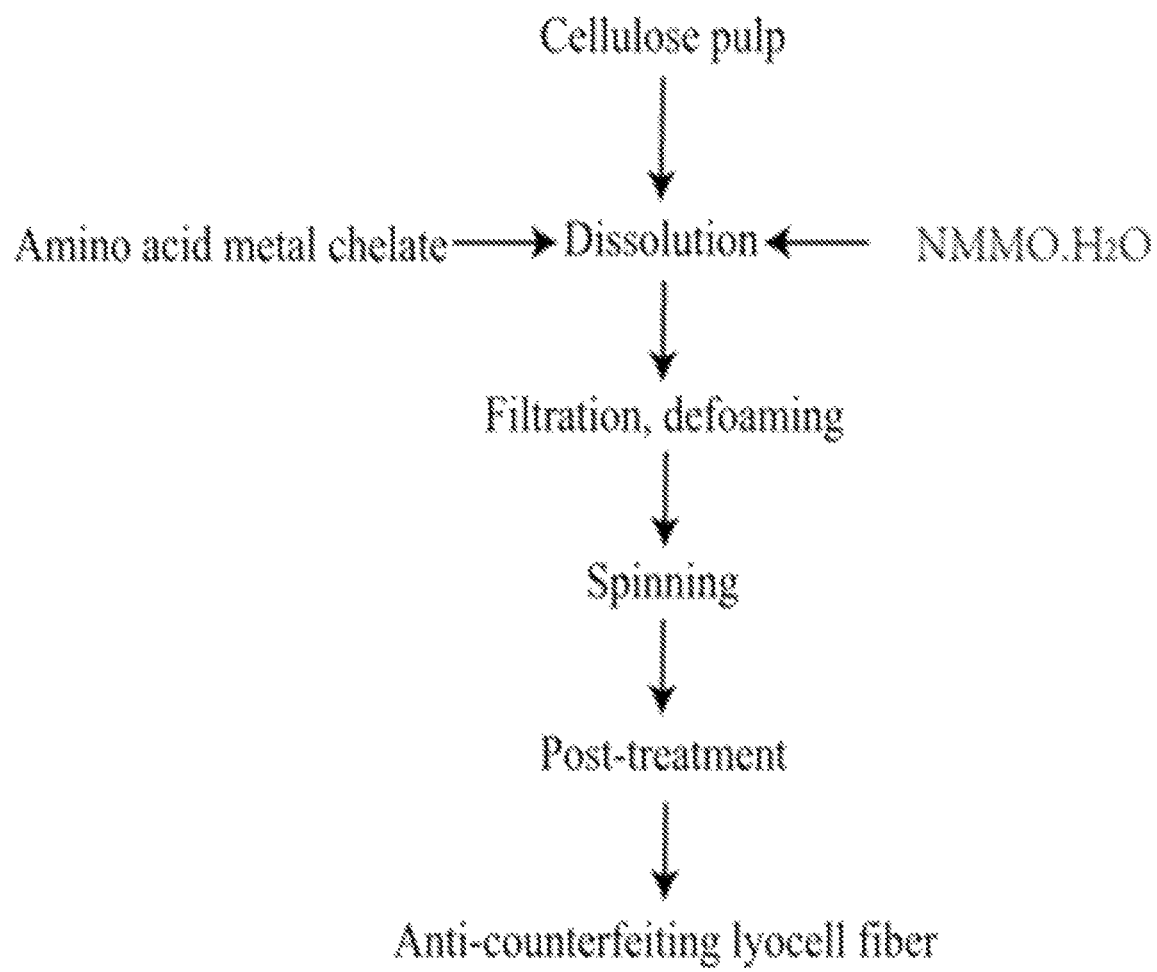

ANTI-COUNTERFEITING LYOCELL FIBER, PREPARATION METHOD THEREOF AND ANTI-COUNTERFEITING METHOD

This application is the National Stage Application of PCT/CN2021/094785, filed on May 20, 2021, which claims priority to Chinese Patent Application No. 202011254961.7, filed on Nov. 11, 2020, which is incorporated by reference for all purposes as if fully set forth herein.

FIELD OF THE INVENTION

The present invention relates to anti-counterfeiting fibers, and more particularly to an anti-counterfeiting lyocell fiber, preparation method thereof and an anti-counterfeiting method.

DESCRIPTION OF THE RELATED ART

At present, many anti-counterfeiting manufacturers in China use anti-counterfeiting identification manufacturing equipment with a low level of intelligent automation and poor technical performance. The common anti-counterfeiting fibers include thermochromic fibers, photochromic fibers and fluorescent anti-counterfeiting fibers. Thermochromic fiber is a fiber whose color changes with temperature; photochromic fiber is a fiber that changes reversibly under the irradiation of sunlight and ultraviolet light; and fluorescent anti-counterfeiting fiber, also called visible fluorescent anti-counterfeiting fiber, is colored and used for authenticity identification by detecting whether it emits fluorescence. For example, Chinese patent CN201120429635.5 provides a fiber anti-counterfeiting identification strip, which is easy to operate, but cannot perform anti-counterfeiting tracking of a fiber; Chinese patent CN201610442261.8 provides a preparation method of a nano fluorescent fiber anti-counterfeiting film, which does not affect the properties of a film and is easy to identify, but only has moderate anti-counterfeiting effect; Chinese patent CN201310178819.2 adds a thermochromic fiber in a pulp, so that the prepared paper product has anti-counterfeiting function; and Chinese patent CN104894919A discloses an anti-counterfeiting material, in which at least two photochromic particles are distributed at intervals in the length direction of fibers, and these photochromic particles emit fluorescence under the action of various ultraviolet lights and infrared lights or sunlight, thereby achieving anti-counterfeiting effect.

Amino acids and trace elements are essential nutrients for animals, plants and even human. Combining these two by means of chelation can increase the absorption rate of trace elements. At present, most of the amino acid metal chelates are used in crop fertilizers, animal feeds, etc. Currently, there is no technology to disclose the use of amino acid metal chelates in the preparation of anti-counterfeiting materials.

SUMMARY OF THE INVENTION

In order to solve the above technical problems, the present invention aims to provide an anti-counterfeiting lyocell fiber, preparation method thereof and a anti-counterfeiting method. The anti-counterfeiting lyocell fiber of the present invention uses an amino acid metal chelate for encryption, has simple process flow, does not affect the macroscopic structure and physical and chemical properties of the fiber, and allows the fiber to have the anti-counterfeiting effect.

A first object of the present invention is to disclose use of an amino acid metal chelate as an anti-counterfeiting tracer of an anti-counterfeiting lyocell fiber.

The above use refers to the addition of an amino acid metal chelate as an anti-counterfeiting tracer in the preparation process of a lyocell fiber to obtain an anti-counterfeiting lyocell fiber.

A second object of the present invention is to provide a preparation method of an anti-counterfeiting lyocell fiber, comprising the following steps:

dissolving at least one amino acid metal chelate and a cellulose pulp in an aqueous solution of a cellosolve to obtain a spinning solution, and then performing wet spinning using the spinning solution to obtain an anti-counterfeiting lyocell fiber, wherein the amino acid metal chelate account for 0.2% to 0.6% of the total mass of the anti-counterfeiting lyocell fiber.

Preferably, the amino acid metal chelate is prepared from a metal compound and a ligand amino acid, the molar ratio of the metal compound and the ligand amino acid is 1-2:1-3.

Preferably, the ligand amino acid is selected from the group consisting of lysine, tryptophan, phenylalanine, leucine, isoleucine, threonine, methionine, valine, aspartic acid, glutamic acid and glycine.

Preferably, the metal compound is selected from the group consisting of metal compounds of calcium, zinc, magnesium, potassium and manganese ions.

Preferably, the metal compound is a metal hydroxide, more preferably one or more of $Ca(OH)_2$, $Mg(OH)_2$ and $Zn(OH)_2$.

Preferably, the cellosolve is N-methylmorpholine-N-oxide (NMMO).

Preferably, the mass fraction of the aqueous solution of the cellosolve is 45% to 55%.

Preferably, the bath ratio of the mass of the cellulose pulp to the volume of the aqueous solution of the cellosolve is 1 g: 15-20 mL.

Preferably, the raw material of the cellulose pulp includes one or more of cotton, hemp and bamboo.

Preferably, the method further includes the steps of alcohol washing, water washing, oiling, drying and post-processing after the wet spinning is completed.

Preferably, stirring is performed in vacuum for 3 to 4 h at 100-130° C. in the preparation of the spinning solution.

Preferably, a preparation method of the amino acid metal chelate includes the following steps:

uniformly mixing a metal compound and an amino acid in water, adjusting the pH of the mixture to be neutral or slightly alkaline, smashing, homogenizing and filtering, and then separating a suspension having a solids with a particle size of less than 30 microns; charging the suspension into a high-pressure liquid nano mill at a pressure of 90-130 MPa and at a feeding speed of 1.6-5 L/min to react for 0.5-1.5 h, to obtain an amino acid metal chelate supernatant, and spray drying to obtain an amino acid metal chelate.

A third object of the present invention is to provide an anti-counterfeiting lyocell fiber prepared by the preparation method described above, including a lyocell fiber and at least one amino acid metal chelate, wherein the amino acid metal chelate accounts for 0.2% to 0.6% of the total mass of the anti-counterfeiting lyocell fiber.

A fourth object of the present invention is to provide an anti-counterfeiting method of an anti-counterfeiting lyocell fiber, including an encryption step and a decryption and identification step, wherein:

the encryption step includes encoding the anti-counterfeiting lyocell fiber according to the type and amount of the amino acid metal chelate, and sending encryption information;

the decryption and identification step includes receiving the encryption information, and detecting the types and amounts of amino acids and metal ions in the lyocell fiber; and then comparing them with the received encryption information, to identify the authenticity of the lyocell fiber.

Preferably, the encryption step can be performed simultaneously with the preparation step of the anti-counterfeiting lyocell fiber, and an encoding information table is designed at the same time: encoding is performed according to the types and amounts of amino acids and metal ions contained in the amino acid metal chelate, to encode amino acids and metal ions with different numbers; and ranking is performed according to the amounts of amino acids and metal ions in the encryption, so that a string of numbers for real fibers can be obtained.

Preferably, in the decryption and identification step, after detecting the types and amounts of amino acids and metal ions in the lyocell fiber, a comparison can be performed with the received encryption information (including the real fiber number and the encoding information table), and if matching with the real fiber number, the fiber is identified as a real fiber, or otherwise, the fiber is identified as a fake fiber.

In the present invention, the anti-counterfeiting lyocell fiber has the advantages of memory tracking properties, identification function as well as high anti-counterfeiting strength: an amino acid metal chelate is added to a spinning solution at a certain ratio, the types and contents of amino acids and the contents of metal ions in a fiber prepared by wet spinning can be detected by the detection technology below, and anti-counterfeiting numbers can be set according to their respective ratios. Regardless of the processes of preparing fibers, yarns or fabrics, or dyeing or printing, etc., respective products prepared from this fiber all have anti-counterfeiting properties with memory tracking.

By means of the above technical solution, the present invention has the following advantages:

The present invention provides a traceable anti-counterfeiting lyocell fiber by adding a traceable anti-counterfeiting amino acid metal chelate in the spinning solution to prepare an anti-counterfeiting lyocell fiber, and by detecting the contents of metal ions and amino acids. Herein, the types and amounts of amino acids and metal ions can be optionally controlled, and anti-counterfeiting labeling is performed using the types and amount ratios of amino acids and metal ions. This anti-counterfeiting means are not easy to be perceived, the anti-counterfeiting effect is good, and the production process is relatively simple.

The forgoing description is only used for summarizing the technical solution of the present invention, and in order to more clearly understand the technical means of the present invention and implement the present invention according to the description, preferred embodiments of the present invention are described below in detail in conjunction with the drawings.

BRIEF DESCRIPTION OF THE DRAWINGS

FIG. 1 is a flowchart of a preparation method of an anti-counterfeiting lyocell fiber.

DETAILED DESCRIPTION OF THE PREFERRED EMBODIMENTS

As shown in FIG. 1, a preparation method of an anti-counterfeiting lyocell fiber of the present invention includes the following steps:

(1) preparation of an amino acid metal chelate: a metal compound to be chelated and a ligand amino acid are mixed in deionized water, and are sufficiently stirred to form a suspension, the pH is adjusted to be neutral or slightly alkaline, and then the suspension is smashed, homogenized and filtered, to obtain a suspension having a solids with a particle size of less than 30 microns; the suspension is charged into a high-pressure liquid nano mill by a high-pressure pump at a pressure of 90-130 MPa and at a feeding speed of 1.6-5 L/min to react for 0.5-1.5 h, to obtain an amino acid metal chelate supernatant, and spray drying is performed on the supernatant to obtain an amino acid metal chelate. Herein, the amino acid can be lysine, tryptophan, phenylalanine, leucine, isoleucine, threonine, methionine, valine, aspartic acid, glutamic acid, glycine, or a combination thereof. The metal element in the metal compound can be calcium, iron, zinc, magnesium, potassium, manganese, or a combination thereof.

(2) Preparation of an anti-counterfeiting spinning solution: an aqueous solution of NMMO having a mass fraction of 47 to 56% is subjected to reduced pressure distillation to have a suitable concentration, the amino acid metal chelate and a cellulose pulp are dissolved into the NMMO aqueous solution at a bath ratio of the mass (g) of the cellulose pulp to the volume (ml) of the NMMO aqueous solution of 1:15 to 20, and the resulting solution is dissolved under vacuum stirring for 3 to 4 h at 100 to 130° C. in a reactor, to obtain a uniform spinning solution having a suitable mass fraction.

(3) Spinning of the fiber: the spinning solution obtained in step (2) is added to a screw extruder, and is further dissolved and filtered at 100 to 120° C., and fed to a spinning system where the air gap length is 6-8 cm, the spinning speed is 40-50, the spinneret aperture is 40 microns, and the orifice capillary length is 400 microns; the sprayed thread is subjected to vertical stretching in air, fed to a solidification bath for solidification forming, the solidification bath is a NMMO aqueous solution with a concentration of 15%, and the solidification bath temperature is 0° C.

(4) Alcohol washing of the fiber: the fiber obtained in step (3) is immersed into an ethanol solution with a suitable concentration, wherein the immersion time is 3.5 to 4.5 h, and the bath ratio is 1:15-20.

(5) Water washing of the fiber: the fiber treated in step (4) is immersed into heat water at 80 to 90° C., and the immersion time is 2 to 3 h, and the bath ratio is 1:20-30.

(6) Oiling of the fiber: the fiber treated in step (5) is immersed into an oil bath solution, wherein the immersion time is 2.5 to 3 h, the oil bath temperature is 80 to 900° C. and the bath ratio is 1:20-30.

(7) Drying of the fiber: the fiber treated in step (6) is dried to obtain an anti-counterfeiting lyocell fiber.

A detailed description of the present invention will be further given below in detail with reference to examples. The following examples are merely used for illustrating the present invention, and not intended to limit the scope of the present invention.

Example 1

A preparation method of an anti-counterfeiting lyocell fiber was as follows:

(1) preparation of an anti-counterfeiting tracer: $Ca(OH)_2$, $Mg(OH)_2$ and $Zn(OH)_2$ were mixed with aspartic acid, where the three hydroxides had a molar ratio of 1:2:3 in this order, and each metal compound and the amino acid were mixed in a molar ratio of 1:2. The above reactant and water were mixed in a mass ratio of 25:75 and sufficiently stirred, the mixture was adjusted to a pH of 7.8 and subjected to colloidal grinding and homogenization so that the reactant was fully dissolved and diffused, the suspension was further filtered so that the solid particle size in the suspension was less than 30 microns, and then the suspension was charged into a high-pressure liquid nano mill at a controlled pressure of 100 MPa and a feeding speed of 3 L/min to react for 1 h, to obtain aspartic acid chelated calcium, aspartic acid chelated magnesium and aspartic acid chelated Zinc solutions, and the reaction solutions were spray dried to obtain crystalline powder products, namely, three amino acid metal chelates.

(2) Preparation of a spinning solution: the three amino acid metal chelates obtained in step (1) and a cellulose pulp were dissolved into a NMMO aqueous solution at a bath ratio of the mass (g) of the cellulose pulp to the volume (ml) of the NMMO aqueous solution of 1:15, and the resulting mixture was dissolved under vacuum stirring for 3 h at 100 to 130° C. in a reactor, to prepare a uniform spinning solution having a mass fraction of 16 to 18%. Herein, the cellulose pulp was 500 g, and the total mass of the amino acid metal chelates was 3 g.

(3) Spinning of the lyocell fiber: the spinning solution treated in the step above was added to a screw extruder, further dissolved and filtered at 110° C., and fed to a spinning system where the air gap length was 7 cm, the spinning speed was 45 m/min, the spinneret aperture is 40 microns, and the orifice capillary length is 400 microns; the sprayed thread was subjected to vertical stretching in air, and solidification formed at a solidification bath of the NMMO aqueous solution with a concentration of 15% at a solidification bath temperature of 0° C. Further preparation processes of alcohol washing, water washing, oiling, drying, and post-processing were performed, to obtain a traceable anti-counterfeiting functional lyocell fiber.

Example 2

An anti-counterfeiting lyocell fiber was prepared according to the method of example 1, except that in step (1), three amino acids were selected and mixed with different metal compounds. Specifically, $Ca(OH)_2$ was mixed with lysine, $Mg(OH)_2$ was mixed with isoleucine and $Zn(OH)_2$ was mixed with threonine, and each metal compound and the corresponding ligand amino acid were mixed in a molar ratio of 2:3. The amino acid metal chelates used in step (2) were changed accordingly.

Example 3

An anti-counterfeiting lyocell fiber was prepared according to the method of example 1, except that in step (1), only one metal compound was selected and mixed with three amino acids. Specifically, $Ca(OH)_2$ was mixed with lysine, isoleucine and threonine, respectively, and the metal compound and each ligand amino acid were mixed in a molar ratio of 1:3.

The types and amounts of metal elements in the anti-counterfeiting lyocell fibers prepared in examples 1 to 3 were detected using the following method, and the specific detection method was:

(S1) 0.1 g of a sample of the anti-counterfeiting lyocell fiber was added into 10 mL of a sulfuric acid solution, and then subjected to digestion treatment where the digestion temperature was gradually increased to 180° C. and maintained for 30 min; the digested solution was evaporated at 135° C. for 3 h to remove sulfuric acid, and made up to volume to obtain 10 ml of a constant volume solution.

(S2) The constant volume solution obtained in step (S1) was subjected to quantitative element analysis by an inductively coupled plasma spectrometer. The measured total metal ion content, and contents and ratio of the metal ion elements in the anti-counterfeiting lyocell fibers prepared in examples 1 to 3 are shown in table 1.

In addition, the types and amounts of amino acids in the anti-counterfeiting lyocell fibers prepared in examples 1 to 3 were detected using the following method, and the specific detection method was:

(a) Sampling: staple fibers with a length of no more than 5 mm were selected, and then 0.5000 g of a sample was weighed and placed in a hydrolysis tube.

(b) Hydrolysis and deacidification: 15.0 ml of a 6.0 mol/L hydrochloric acid solution was further added to the hydrolysis tube where the staple fiber sample was placed, the tube was putted into an ice-water mixture and cooled for 4 min, and then high-purity nitrogen was introduced into the tube for about 2 min, and the tube was quickly capped and crimp sealed, and then the hydrolysis tube was placed into a thermostatic dryer at 110° C. for hydrolysis and after 22 h, removed and cooled. After the hydrolysis tube was opened, the hydrolysate was transferred to a 50 ml volumetric flask, and after the hydrolysis tube was rinsed several times with water, the hydrolysate was made up to volume, uniformly mixed and filtered with a filter paper. Further, 1.0 ml of the filtrate was pipetted into a 5 ml breaker, the breaker was placed into a thermostatic dryer at 50° C. for drying, the residue was dissolved with 2.0 ml water and then dried, and the dissolution and drying operations were repeated twice, until it was completely evaporated to dryness. 1.0 ml of a 0.02 mol/L hydrochloric acid was pipetted to fully dissolve the residue that was evaporated to dryness in the breaker, and further filtration was performed using an aqueous-phase filter membrane with a 0.45-micron pore size, and the filtrate was used for detection by an amino acid automatic analyzer.

(c) Instrument detection: 0.2 mol of a mixed amino acid standard solution was drawn and diluted to 5 ml with a 0.02 mol/L hydrochloric acid solution to serve as a standard solution for detection by an amino acid automatic analyzer, where the diluted amino acid standard solution had a concentration of 100 nmol/L, and the types and amounts of amino acids in the extract were measured using the external standard method. The ion exchange separation column used in the detection was a 4.6 nm×60 nm proteolysis column, the reaction column was a 4.6 mm×40 mm reaction column with internal small particles of inert emery, the temperature of the separation column and the temperature of the reaction column were 57° C. and 135° C. respectively, the detection wavelengths were 570 nm and 440 nm respectively, and the injection volume was 20 microns. The measured total amino acid content, and contents and ratio of the amino acids in the anti-counterfeiting lyocell fibers prepared in examples 1 to 3 are shown in table 1.

TABLE 1

Detection results of contents of amino acids and metal elements in different anti-counterfeiting lyocell fibers

|  | Example 1 | Example 2 | Example 3 |
|---|---|---|---|
| Aspartic acid | 0.21% | \ | \ |
| Lysine | \ | 0.031% | 0.098% |
| Isoleucine | \ | 0.054% | 0.090% |

TABLE 1-continued

Detection results of contents of amino acids and metal elements in different anti-counterfeiting lyocell fibers

|  | Example 1 | Example 2 | Example 3 |
|---|---|---|---|
| Threonine | \ | 0.085% | 0.104% |
| Calcium element | 3.0320 ppm | 2.2253 ppm | 14.2253 ppm |
| Magnesium element | 4.0341 ppm | 4.8780 ppm | \ |
| Zinc element | 5.7324 ppm | 6.5650 ppm | \ |
| Proportion of total amino acid content | 0.21% | 0.17% | 0.292% |
| Mass ratio of amino acids | \ | Lysine:Isoleucine:Threonine = 3.1:5.4:8.5 | Lysine:Isoleucine:Threonine = 3.3:3:3.41 |
| Proportion of total metal ion content | 0.128% | 0.137% | 0.142% |
| Mass ratio of metal ions | Magnesium:Calcium:Zinc = 3.03:4.034:5.7324 | Calcium:Magnesium: Zinc = 2.23:4.88:6.57 | \ |

In table 1, the proportion of total amino acid content and the proportion of total metal ion content refer to the percentage of amino acids or metal ions based on the total mass of the anti-counterfeiting lyocell fiber.

The anti-counterfeiting method of the present invention is described below by taking example 2 as an example.

Before the preparation of the anti-counterfeiting lyocell fiber, amino acids and metal elements are previously encoded according to the formulation, where calcium is represented by letter C, magnesium is represented by letter M, Zinc is represented by letter Z, and lysine, isoleucine and threonine are represented by numbers 1, 2 and 3 respectively. The metal element encodings are arranged before the amino acid encodings, and they are arranged from left to right in a decreasing order according to the contents, and therefore, example 2 is to prepare an anti-counterfeiting lyocell fiber with a target code of ZMC321.

The lyocell fiber sample was produced by the method of example 2, the lyocell fiber product and the design password of the fiber were obtained by a user, and the obtained lyocell fiber was decrypted. In the decryption, the types and amounts of amino acids, and the types and amounts of metal elements were detected according to the detection method described herein, and then the encodings are combined in order to obtain a decrypted password ZMC321, and this decrypted password was compared with the obtained design password, thereby achieving anti-counterfeiting identification of the lyocell fiber. In addition, this encoding mode can be used for both example 1 and example 3 and both have extremely high accuracy.

Additionally, the effect of the method of the present invention on the mechanical properties of the lyocell fiber was tested, and the results are shown in table 2.

TABLE 2

Breaking strength and elongation at break of the lyocell fibers in the examples and the comparative group

|  | Example 1 | Example 2 | Example 3 | Comparative group |
|---|---|---|---|---|
| Dry breaking strength (cN/dtex) | 3.50 | 3.48 | 3.44 | 3.63 |
| Dry elongation at break (%) | 13.5 | 13.7 | 13.4 | 13.5 |
| Wet breaking strength (cN/dtex) | 2.51 | 2.43 | 2.55 | 2.48 |
| Wet elongation at break (%) | 15.2 | 14.6 | 15.7 | 14.8 |

Herein, the comparative group in Table 2 is a lyocell fiber prepared without adding any amino acid metal chelate. According to GB/T 14337-2008—Testing Method for Tensile Properties of Man-made Staple Fibers, breaking strength and elongation at break of the lyocell fibers prepared in the examples 1, 2 and 3 were tested by a fiber breaking strength tester, and the test results of the examples and the comparative group were compared. The results show that the changes in contents and types of amino acids and metal elements have minor impact on the mechanical properties of the lyocell fibers, and do not cause major fluctuations in the mechanical properties of the lyocell fibers.

The description above merely gives the preferred embodiments of the present invention, and is not intended to limit the present invention. It should be noted that several modifications and variations can be made by those of ordinary skill in the art without departing from the technical principles of the invention, and these modifications and variations should be considered within the scope of the present invention.

What is claimed is:

1. A preparation method of an anti-counterfeiting lyocell fiber, comprising steps of:
dissolving at least one amino acid metal chelate and a cellulose pulp in an aqueous solution of a cellosolve to obtain a spinning solution, and then performing wet spinning using the spinning solution to obtain the anti-counterfeiting lyocell fiber, wherein the amino acid metal chelate accounts for 0.2% to 0.6% of the total mass of the anti-counterfeiting lyocell fiber.

2. The preparation method according to claim 1, wherein the amino acid metal chelate is prepared from a metal compound and a ligand amino acid, the molar ratio of the metal compound and the ligand amino acid being 1-2: 1-3.

3. The preparation method according to claim 2, wherein the ligand amino acid is selected from the group consisting of lysine, tryptophan, phenylalanine, leucine, isoleucine, threonine, methionine, valine, aspartic acid, glutamic acid and glycine.

4. The preparation method according to claim 2, wherein the metal compound is selected from the group consisting of metal compounds of calcium, zinc, magnesium, potassium and manganese ions.

5. The preparation method according to claim 1, wherein the cellosolve is N-methylmorpholine-N-oxide; and the mass fraction of the cellosolve in the aqueous solution is 45% to 55%.

6. The preparation method according to claim 1, wherein the bath ratio of the mass of the cellulose pulp to the volume of the aqueous solution of the cellosolve is 1 g: 15-20 mL.

7. The preparation method according to claim 1, wherein a raw material of the cellulose pulp comprises one or more of cotton, hemp and bamboo.

8. An anti-counterfeiting lyocell fiber prepared by the method of claim 1, comprising a lyocell fiber and the at least one amino acid metal chelate, wherein the amino acid metal chelate accounts for 0.2% to 0.6% of the anti-counterfeiting lyocell fiber.

9. An anti-counterfeiting method of the anti-counterfeiting lyocell fiber of claim 8, comprising:
- an encryption step comprising encoding the anti-counterfeiting lyocell fiber according to the type and amount of the at least one amino acid metal chelate, and sending encryption information; and
- a decryption and identification step comprising receiving the encryption information, and detecting the types and amounts of amino acids and metal ions in the lyocell fiber; and comparing them with the received encryption information, to identify the authenticity of the lyocell fiber.

* * * * *